United States Patent [19]

Knox et al.

[11] Patent Number: 5,374,473
[45] Date of Patent: Dec. 20, 1994

[54] DENSE POLYTETRAFLUOROETHYLENE ARTICLES

[75] Inventors: John B. Knox, Chadds Ford, Pa.; William E. Delaney, III, Hockessin, Del.; John M. Connelly, Jr., Rising Sun, Md.

[73] Assignee: W. L. Gore & Associates, Inc., Newark, Del.

[21] Appl. No.: 932,441

[22] Filed: Aug. 19, 1992

[51] Int. Cl.$^5$ ............................................. B32B 7/02
[52] U.S. Cl. ................................. 428/218; 428/34.5; 428/34.6; 428/35.7; 428/35.9; 428/36.5; 428/71; 428/219; 428/220
[58] Field of Search ............ 428/34.5, 34.6, 35.7, 428/35.9, 36.5, 71, 218, 219, 220

[56] References Cited

U.S. PATENT DOCUMENTS

| | | | |
|---|---|---|---|
| 3,953,566 | 4/1976 | Gore | 264/288 |
| 4,187,390 | 1/1980 | Gore | 264/288 |
| 4,482,516 | 11/1984 | Bowman et al. | 264/127 |
| 4,732,629 | 3/1988 | Cooper et al. | 156/53 |
| 4,996,097 | 2/1991 | Fischer | 428/220 |
| 5,061,561 | 10/1991 | Katayama | 428/364 |

FOREIGN PATENT DOCUMENTS

| | | |
|---|---|---|
| 0010943 | 5/1980 | European Pat. Off. |
| 2212598 | 7/1989 | United Kingdom |
| 9200343 | 1/1992 | WIPO |
| WO9213205 | 8/1992 | WIPO |

*Primary Examiner*—Patrick J. Ryan
*Assistant Examiner*—Richard P. Weisberger
*Attorney, Agent, or Firm*—Gary A. Samuels

[57] ABSTRACT

This invention provides a densified previously expanded PTFE article having remnants of a fibril and node structure and a process for producing the article. A PTFE shape is compressed through the application of heat and pressure while the shape itself is under a vacuum, thus forming the densified ePTFE article. The densified PTFE article exhibits increased flexural strength.

A diaphragm containing the densified ePTFE article as one layer is also disclosed.

4 Claims, 2 Drawing Sheets

DENSE POLYTETRAFLUOROETHYLENE ARTICLES

FIELD OF THE INVENTION

This invention relates to new forms of expanded polytetrafluoroethylene which retain the characteristic node and fibril structure of expanded polytetrafluoroethylene; and to a process for making them which involves the bonding and simultaneous densification of individual thin sheets of expanded PTFE using heat, pressure and vacuum.

BACKGROUND OF THE INVENTION

Fluoropolymers are characterized by the fact that they are highly inert, paraffinic polymers in which some or all of the hydrogen have been replaced by fluorine. Fluoropolymers in general, and polytetrafluoroethylene (PTFE) in particular, have exhibited utility as materials for use in harsh chemical environments which may degrade many conventional polymeric materials. PTFE also has a useful range of temperature from as high as 260° C. to as low as near −273° C.

However PTFE exhibits poor mechanical properties, such as low tensile strength and low cold flow properties. In particular films of low porosity PTFE made by a skiving process in which solid PTFE films are shaved or split from a thicker article exhibit poor strength and flexibility and thus cannot be combined in a single structure with highly flexible materials such as neoprene rubber. These poor mechanical properties limit the use of PTFE in many situations.

PTFE may be produced in an expanded porous form as taught in U.S. Pat. No. 3,953,566. This material, expanded porous polytetrafluoroethylene (ePTFE), has a microstructure consisting of nodes interconnected by very small fibrils and is of higher strength than unexpanded PTFE while maintaining the chemical inertness and wide useful temperature range of PTFE.

However, ePTFE cannot be used as a barrier layer to chemicals since it can rapidly absorb through its pores liquids that have a low surface tension, e.g., less than 50 dynes/cm. A process that makes films, sheets or forms of various thickness out of densified ePTFE having substantially no porosity maintaining the high strength of the node and fibril structure of ePTFE would therefore have wide utility as a barrier to harsh chemicals.

Dense ePTFE structures are taught in U.S. Pat. No. 3,953,566 in which a platen press is used to densify a very thin sheet of ePTFE either with or without heat, however in practice using multiple layers results in the trapping of air within the expanded structure and also between layers so that high densities are not achieved in structures having thickness greater than the starting sheet. Also cold flow takes place in the press resulting in non uniformly shaped final parts. Dense EPTFE structures are also described in U.S. Pat. No 4,732,629 to Cooper et al., however the method used is not able to generate high densities in thick films and again air is trapped within the fine structure of the ePTFE plies resulting in low densities. U.S. Pat. No. 5,061,561 to Katayama discloses a method to make fibers with high density from ePTFE similar to that used in this invention, however, the method yields a material that is significantly different from that in this invention as evidenced by DSC peaks at 345° C. and 380° C. Furthermore the Katayama process is different and is applicable only to fine filaments and not to sheets or formed shapes.

SUMMARY OF THE INVENTION

This invention comprises both process and products. The process is a process for making formed articles of densified ePTFE which comprises placing two or more layers of expanded porous PTFE inside a heat and pressure stable flexible container, evacuating gas from the inside of the container until the pressure in the container is 13 inches of mercury or lower, and preferably 20 inches or less, then subjecting the flexible container to a pressure of between 150–350 psi and a temperature of at least 368° C., preferably between 368° C. and 400° C., then cooling the container while reducing the pressure on the container, and retrieving the densified ePTFE. The densified PTFE layers can contain one or more reinforcing layers of a fabric material.

In one preferred aspect, the process is a process for making densified ePTFE films, sheets or formed articles with sufficient thickness and low enough porosity to allow their use as barrier layers either alone or when combined in later constructions with other materials which comprises:

(a) layering any number, i.e. at least 2 individual sheets of porous ePTFE film on a plate that can withstand temperatures exceeding 380° C. and pressure up to 250 psi, (b) laying a second plate over the top of the film layers, (c) placing the two plates containing the ePTFE sheets inside a bag made of polyimide film or other flexible film stable for several hours at temperatures as high as 380° C.

(d) fitting the bag with a hose connection and placing the assembly in an autoclave, (e) drawing a vacuum inside the bag and gradually raising the temperature and pressure inside the autoclave over a period of time until reaching the sintering temperature of the ePTFE and a pressure between 150–350 psi, and preferably between 200–250 psi.

(f) after a suitable time between about 10 minutes and 4 hours, cooling the autoclave while gradually reducing the pressure, (g) removing the bag from the autoclave, and removing the ePTFE from the bag and plates.

In another preferred aspect the process is a process for making reinforced densified ePTFE articles with similar barrier properties as the preceding but having even higher strength in the x and y directions which comprises (a) layering any number i.e., at least two, individual sheets of porous ePTFE film and at least one sheet of a woven fabric made from porous PTFE filaments prepared as described in U.S. Pat. No. 3,962,153 to Gore, (the fabric being sandwiched between layers of ePTFE) on a plate that can withstand temperatures exceeding 380° C. and a pressure up to 250 psi, (b) then following the procedures outlined in the previous preferred aspect in this application.

In another embodiment, the plates can be a shaped form of suitable metal around which tape is wrapped, and then sealed into the bag and subjected to the conditions above.

It is understood that an autoclave chamber can be replaced with a platen press which has been equipped with a vacuum enclosure allowing evacuation of air and gasses from the layers being placed under heat, pressure or both.

One product of the invention is a material consisting essentially of a sintered, densified, previously-expanded polytetrafluoroethylene, exhibiting remnants of a fibril and node structure as characterized by peaks at about 327° C. and about 380° C. in a thermogram of differential scanning calorimetry in the course of a temperature rise of 10° C./min, and by having a density of 2.1, preferably 2.14, gm/cc or greater. The densified PTFE can contain one or more reinforcing layers of a fabric material, such as fabric of woven expanded porous PTFE fibers.

Another product of the invention is a pump diaphragm made of a layer of the densified ePTFE laminated to a flexible elastomeric polymer.

DESCRIPTION OF THE INVENTION

The process of the invention consists of the bonding and simultaneous densification of a plurality of sheets or tapes comprised of expanded polytetrafluoroethylene (ePTFE) (with or without the reinforcing fabric) such as that described in U.S. Pat. No. 3,953,566 to Gore incorporated here by reference. The process of bonding and densifying under vacuum is novel in that for the first time it allows the elimination of substantially all the pores in the ePTFE while preventing the loss of thickness and/or any substantial change of shape due to flow of the material as occurs in a platen press. In addition the node and fibril structure of the original ePTFE as evidenced by DSC peaks at 327° C. and at 380° C. is retained.

The ePTFE used is selected to maximize strength in the direction desired for the final article. Thus all plies may be expanded in one direction or the plies may be biaxially expanded or be laid up in two or more directions to make a final part with uniform strength in the x-y plane. The invention is not limited to the number of plies bonded and densified.

Densification may be accomplished at times varying from 15 minutes to over four hours and at temperatures from 330° C. to 390° C. with pressures as low as 150 psi and as high as 350 psi. One skilled in the art will recognize that there exists a relationship between the thickness of the object being formed and the times, temperatures, and pressures most effective. In particular it is understood that excessively high temperatures or long times can lead to the loss of the node and fibril structure originally present in the ePTFE and therefore a return to poorer PTFE physical properties. Conversely process conditions that are not aggressive enough result in only partial densification and in some cases formation of a skin of dense material over a partially densified core. In these cases the item is often but not always non-uniform in appearance.

The densified ePTFE structure are useful in making composite diaphragms for use in pumps where good flex life is important. The ePTFE structure is securely attached to a flexible backing, preferably an elastomer.

Figure 2:
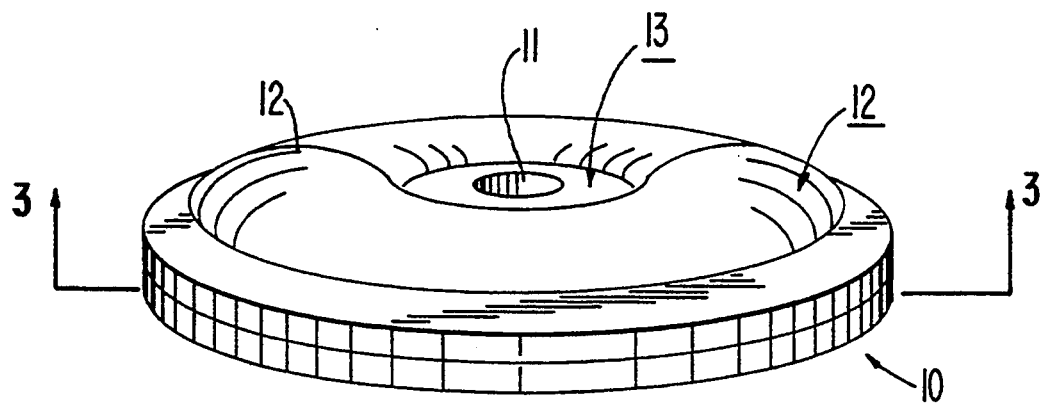
FIG. 2 depicts a pump diaphragm which is made using a densified product of this invention.

Referring to FIG. 2, a composite diaphragm 10 in a molded form is depicted. Composite diaphragm 10 has a central through hole 11 for attachment of the diaphragm to a means for reciprocating the inventive diaphragm.

Still referring to FIG. 2, the composite diaphragm is comprised of convex area 12 and concave area 13. The shape and placement of the convex and concave areas of the diaphragm are dependent on design requirements of the article in which the diaphragm is placed.

In order to produce the composite diaphragm, a molding process can be performed. The layers which comprise the inventive diaphragm are arranged in a mold having a desired shape. The mold containing the layers is subsequently subjected to a sufficient amount of heat and pressure through press molding, autoclave molding, roto-molding, vacuum forming or thermoforming processes such that the layers conform to the mold and retain the desired shape upon removal from the mold.

Figure 3:
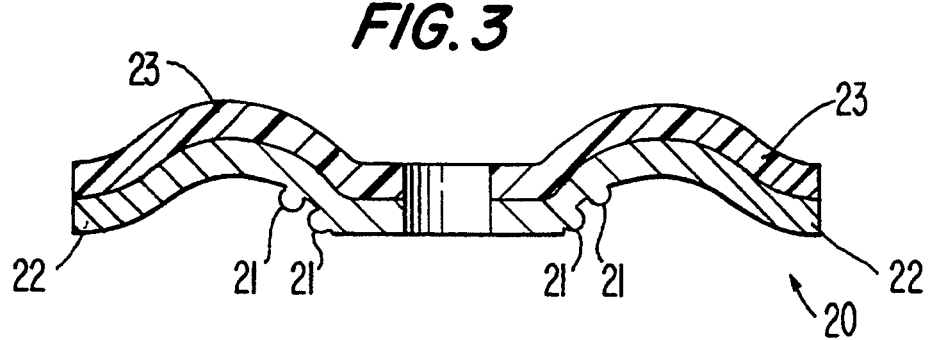
FIG. 3 is a cross-section taken along line 3—3 of FIG. 2.
Figure 4:
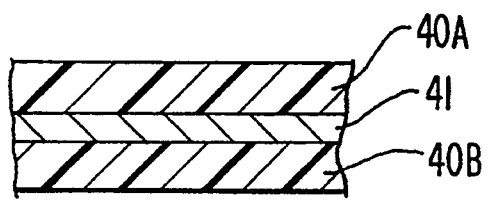
FIG. 4 is a cross-section of a layered construction of the invention in which 40A and 40B are layers of densified PTFE separated by a reinforcing layer 41 of a woven fabric made of expanded porous PTFE fibers.

Referring now to FIG. 3, a cross-sectional view of the diaphragm in FIG. 2 taken along line 3—3 is depicted. The composite nature of the diaphragm is more readily apparent. Numeral 23 represents the densified ePTFE layer while 22 represents a flexible elastomeric layer. On a back surface 20 of the diaphragm, a series of concentrically arranged elastomeric ribs 21 are formed in the flexible elastomeric layer 22. These ribs are positioned in that portion of the diaphragm that reciprocally flexes as the diaphragm is used.

The ribs distribute the forces associated with the reciprocation of the diaphragm resulting in the formation of many shallow radial creases in the ePTFE layer rather than the formation of a few (normally four to eight) deep creases. Since deep radial creases greatly weaken the ePTFE layer, this substantially extends the wear life of the diaphragm. Placement of the ribs in the elastomeric layer, rather than in the ePTFE layer, allows greater freedom of design.

One preferred embodiment of the diaphragm invention is where the flexible polymer is a thermosetting elastomer selected from the class consisting of fluoroelastomers including those containing hydrogen and those not containing hydrogen, perfluoroelastomers, and fluoroelastomers containing silicone moieties, nitrile elastomers, acrylic elastomers, olefin diene elastomers, chlorosulfonated polyethylene elastomers, polychloroprene elastomers, butyl and halogenated butyl elastomers, styrene-butadiene elastomers, polydiene elastomers and silicone elastomers. It is preferred that the thermosetting elastomers in the above-mentioned class have a flexural elastic modulus (ASTM D790-84a) of less than 1,400 MPa.

Another preferred embodiment of the diaphragm invention is where the flexible polymer is a thermoplastic elastomer selected from the class consisting of copolyetherester elastomers, polyurethane elastomers, styrene polyolefin block copolymer elastomers, polyamide elastomers, ethylene copolymer elastomers, and thermoplastic elastomers produced by the process of dynamic vulcanization as described in U.S. Pat. No. 4,130,535 to Coran et al. wherein a blend of a curable elastomer and a plastic results in a thermoplastic elastomeric composition. The thermoplastic elastomers in the above-mentioned class have a flexural elastic modulus (ASTM D790-84a) of less than 1,400 MPa.

Another preferred embodiment of the diaphragm invention is where the flexible polymer is a thermoplastic having a flexural elastic modulus (ASTM D790-84a) less than 1,400 MPa, and selected from the class consisting of fluorinated thermoplastics consisting of copolymers of tetrafluoroethylene, copolymers of vinylidine fluoride, copolymers of chlorotrifluoroethylene, polyolefins, and plasticized polyvinyl chlorides.

TEST METHODS

Differential Scanning Calorimetry

Thermal analysis of a sample is determined through the use of a Differential Scanning Calorimeter. Approximately 10 mg of a sample is placed into the Differential Scanning Calorimeter and the temperature of the sample is increased from 200° C. to 400° C. at a scan rate of 10° C./min.

Density Measurement

Densities were calculated by weighing samples of known area and measured thickness.

Mullins Burst Test

ASTM D-3786-87 test was used. The hydraulic diaphragm type bursting tester specified in section 8.11 to 8.14 of the method was used.

Stress at Break

This was measured by ASTM-D-638, ASTM-D-882 using an ASTM approved die six inches long narrowing to a 0.6 inch dogbone. Crosshead speed was set to 20 inches per minute, test direction was "UP" and jaw faces used were greater than one inch. Stress at break is the tensile strength reading in pounds at the point where the sample breaks.

EXAMPLES

Example 1

Figure 1:
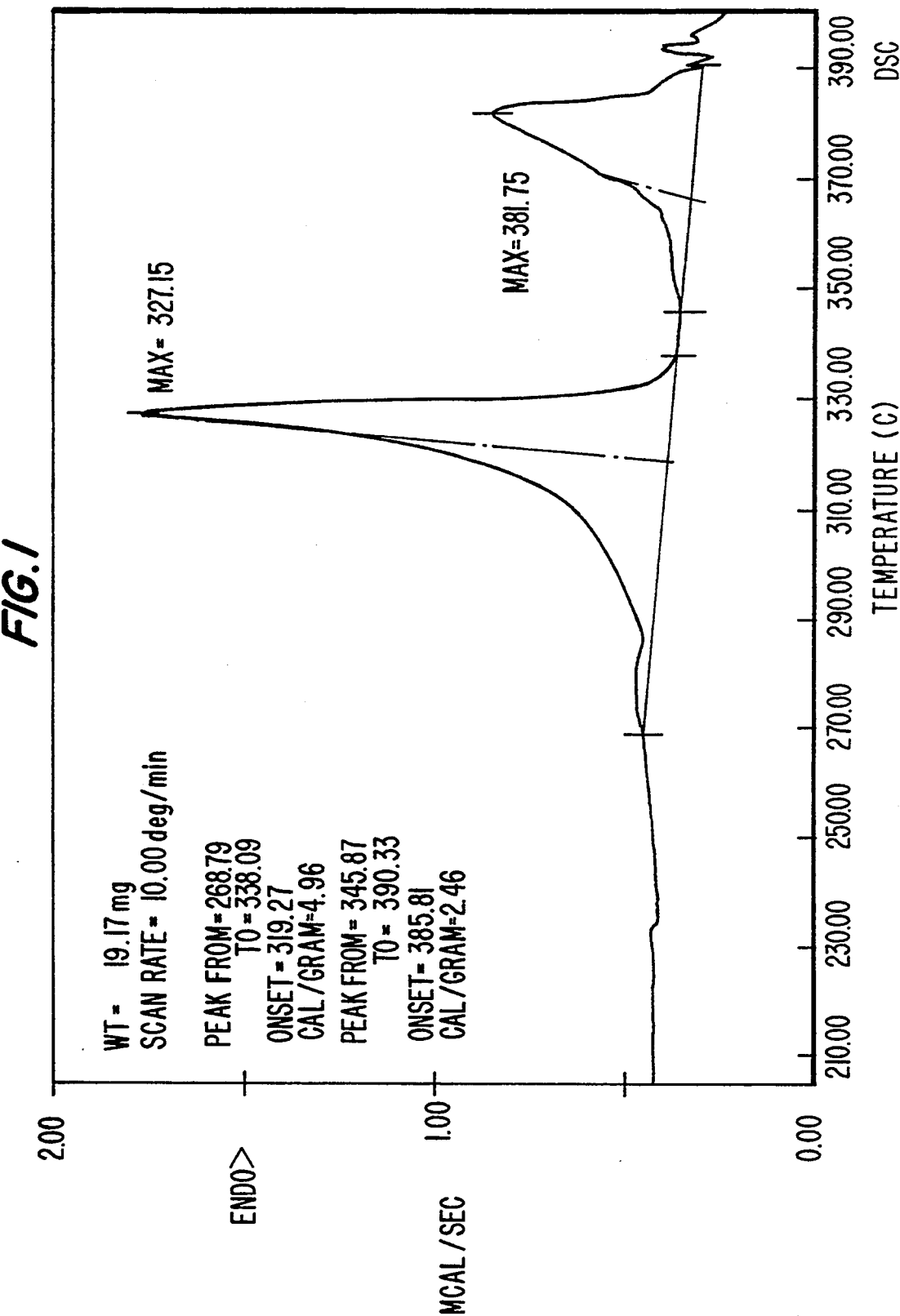
FIG. 1 is a thermogram of Differential Scanning Calorimetry of the inventive material, showing a course of temperature elevation at a rate of 10° C./min.

Forty-five plies of sintered expanded PTFE each with a nominal 1 mil thickness were placed between two caul plates in an autoclave bag assembled from Polyimide film (DuPont's Kapton ®). The assembly was placed in an autoclave (Vacuum Press International Series 24), vacuum was drawn in the bag and the pressure and temperature of the autoclave were gradually raised over a period of 55 minutes until they reached 368° C. and 250 psi. After holding these conditions for 45 minutes the assembly was gradually cooled and the pressure was reduced over a period of about 45 minutes. The resulting sheet of material, which was originally opaque, became translucent and had a density of 2.175 g/cc, and its thermogram had peaks at about 380° C. and 327° C. as shown by FIG. 1.

COMPARATIVE EXAMPLE A

Forty-eight layers of expanded PTFE membrane having a combined thickness of approximately 175 cm were assembled and a 6.35 cm circular sample was die-cut from it. The sample was placed between two four inch polished flat aluminum die halves which were then placed in a platen press at room temperature. The sample was pressed for one hour at 48,000 psi and then removed. The resulting piece was milky white in color and had a density of 1.99 g/cc or a porosity of 8.33%.

The sample was also observed to have grown by cold flow to a diameter of 7.24 cm.

COMPARATIVE EXAMPLE B

A sample similar to the one in Comparative Example A was prepared. This time a two inch diameter piece was placed between the die halves and a pressure of 50,000 lb. was applied at a temperature of 191° C. for 25 minutes. The resulting piece was milky white over most of the disk and nearly translucent from the edges in to about ⅛ inch. The sample was found to have increased in diameter 0.4375 inches. The density was measured and found to be 1.93 g/cc or 10.7% porosity. The higher temperature appeared to result in greater creep and trapped more air than in Example 1 explaining the even lower density.

COMPARATIVE EXAMPLE C

A sample as in Comparative Example B was prepared and placed between die halves in a Carver Model M press and at 330° C. at a pressure of 6400 psi for 16 minutes. The resulting piece was milky white except on the edges where it was almost translucent. The sample exhibited 10% growth in diameter (>20% in area). The density was measured and found to be 2.08 g/cc or 4.35% porosity.

Example 2

A portion of the sheet of material produced in Example 1 was further processed in the following manner:

The sheet of material was etched by immersing the sample for thirty seconds in an alkali napthanate solution (Tetra Etch ® etchant available from W. L. Gore & Associates, Inc., Elkton, Md.). A ten inch diameter circular piece was cut from the etched sheet. A 30% toluene solution of a bonding agent containing an isocyanate (Chemlok 250 available from The Lord Corporation, Erie, Pa.), was brushed on one surface of the etched sheet and allowed to dry.

A layer of an elastomeric polymer, (A Neoprene compound based on Neoprene GK available from E. I. du Pont de Nemours & Co., Wilmington, Del.), 4.2 mm thick, was applied to the surface of the etched sheet upon which the bonding agent had previously been applied. The layer of elastomeric material was adhered to the surface of the etched sheet by placing both layers into a platen press heated to a temperature of 93° C. for about thirty seconds while a light pressure is applied thereby forming a diaphragm preform.

The diaphragm preform was placed in a mold having the desired shape. The mold was subsequently placed in a platen press which applied 7580 MPa of pressure at a temperature of 170° C. for a period of 20 minutes. The mold was allowed to cool to 70° C. while still under pressure.

The resulting diaphragm was removed from the mold and any extra material was trimmed from the diaphragm. The diaphragm was placed in a reciprocating pump (Wilden M4 available from Wilden Manufacturing) and driven by 400N of air pressure against a 127 cm head of water at a rate of 66 cycles per minute. The diaphragm was cycled in the reciprocating pump until the diaphragm developed a hole in one of its layers or such a hole appeared imminent.

The diaphragm of the instant invention achieved 14,800,000 cycles without a failure.

Example 3

A sheet of a woven fabric made from filaments prepared by the method described in U.S. Pat. No. 3,962,153 to Gore was sandwiched between eight layers of GORE-TEX membrane having a combined thickness of approximately 0.026 cm and seven layers of GORE-TEX membrane having a combined thickness of approximately 0.023 cm. This assembly was then placed between caul plates and treated as in Example 1. The resulting sheet was translucent and had a density of 2.23 g/cc.

Example 4

A sample was prepared as in sample 3 above but the fabric was coated with an aqueous dispersion of PTFE fine powder, dried and sintered for about five minutes at a temperature between 368° and 380° C. The resultant fabric had gained 60% by weight in PTFE by this process. When autoclaved, this sample had a final density of 2.19 g/cc and exhibited higher peel force than example number three indicating that PTFE can act as an adhesive bonding agent in this process.

Comparison Showing Reinforcement

Samples of Example 1, 3 and 4 material were measured for stress at break and for Mullins Burst strength. As the Table below shows the autoclave process is capable of preparing even further reinforced materials using ePTFE fiber.

| | EXAMPLE 1 | EXAMPLE 3 | EXAMPLE 4 |
| --- | --- | --- | --- |
| STRESS AT BREAK (per mill thickness) | 10.95 lbs/in | 16.38 lbs/in | 14.58 lbs/in |
| MULLINS BURST STRENGTH (per mil thickness) | 43.4 lbs | 60.9 lbs | 39.3 lbs |

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A material consisting essentially of a sintered, densified expanded polytetrafluoroethylene having remnants of a fibril and node structure as characterized by peaks at about 327° C. and about 380° C. in a thermogram of differential scanning calorimetry in the course of temperature rise of 10° C./min, having a density of 2.10 gm/cc or greater and being substantially free of pores.

2. The material of claim 1 wherein the material has a density of 2.14 cm/cc or greater.

3. The material of claim 1 wherein the material has a density of 2.175 g/cc or greater.

4. The material of claim 1 in which the material is in the form of a plurality of layers of sheets.

* * * * *